No. 639,305. Patented Dec. 19, 1899.
J. SOMMER.
DISINFECTING DEVICE FOR WATER CLOSETS OR THE LIKE.
(Application filed Nov. 5, 1898.)
(No Model.)
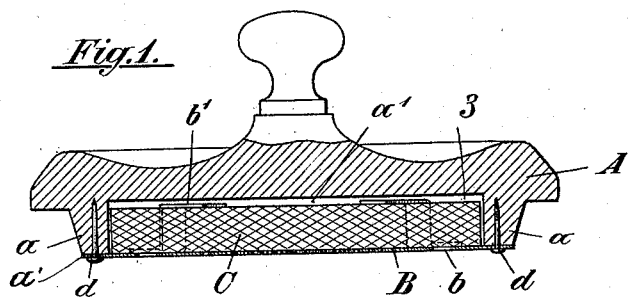
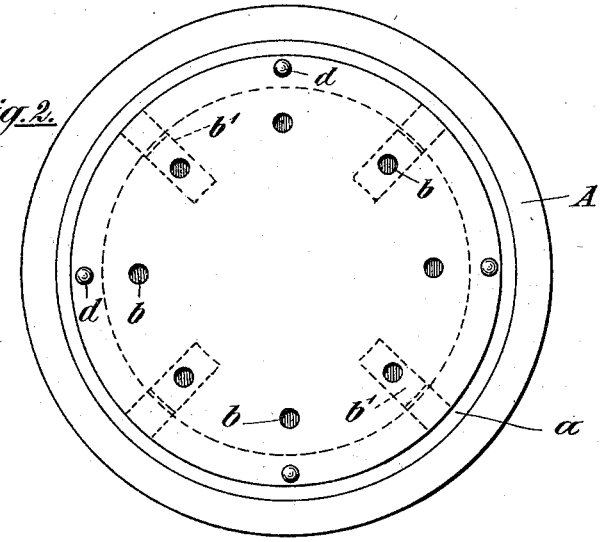
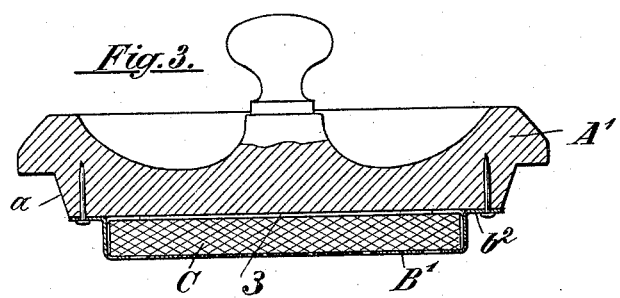
Witnesses:
M. C. Massie
Geo. M. Copenhaver.
Inventor:
Julius Sommer
by Max Meyer
Attorney
THE NORRIS PETERS CO., PHOTO-LITHO., WASHINGTON, D. C.

UNITED STATES PATENT OFFICE.

JULIUS SOMMER, OF STUTTGART, GERMANY.

DISINFECTING DEVICE FOR WATER-CLOSETS OR THE LIKE.

SPECIFICATION forming part of Letters Patent No. 639,305, dated December 19, 1899.

Application filed November 5, 1898. Serial No. 695,562. (No model.)

*To all whom it may concern:*

Be it known that I, JULIUS SOMMER, a citizen of the German Empire, residing at Johannisstrasse 52, Stuttgart, Würtemberg, Germany, have invented certain new and useful Improvements in Disinfecting Devices for Water-Closets or the Like; and I do hereby declare the following to be a full, clear, and exact description of the invention, such as will enable others skilled in the art to which it appertains to make and use the same.

Particular attention has been devoted in recent times to the disinfection and deodorization of water-closets and the like. The scattering of disinfecting-powder down the pan, which is the custom usually adopted, or the pouring of liquid disinfectant substances into the same has only a temporary action which requires, when regularly repeated, a considerable consumption of time and a large quantity of disinfecting material, and thus becomes somewhat expensive. The placing of disinfecting or deodorizing substances in closets has, of course, the action of disinfecting or deodorizing the air in these rooms, but is usually connected with a sharp unpleasant smell, while the most essential source of smell—namely, the pan of the closet—is not disinfected or deodorized.

My invention has for its object to overcome the disadvantages mentioned; and it consists substantially in such features of improvement as will hereinafter be more particularly described.

In carrying my invention into effect I employ on the under side of the lid or cover of the closet-pan or other vessel a suitable disinfecting or deodorizing substance in the form of a cake or block, and I provide also on the under side of the lid or cover suitable means for receiving and holding the cake in place. Said means are perforated for the passage or circulation of air saturated with the disinfecting or deodorizing substance, and the same are also detachable, so as to enable a fresh cake to be inserted whenever necessary or desired. In some instances in order to prevent cracking or crumbling of the cake or block from constant opening and closing of the lid I provide suitable means for fastening the cake to the holder or receiver therefor, which means are readily operated or manipulated without entirely disconnecting said holder or receiver from the lid.

A closet lid or cover provided with my improved arrangement is shown in the accompanying drawings.

Figure 1 is a cross-section, Fig. 2 a view from beneath, and Fig. 3 another cross-section in which the method of attaching the disinfecting material somewhat differs from that shown in Fig. 1.

A cake or block of suitable disinfecting or deodorizing substance C is inserted in a recess $a'$ of the lid or cover A and is attached to a sheet-metal plate B by means of bent or angle strips $b'$ bent over it, said plate engaging over the edge $a$ of the closet-lid and being held to the said lid A by means of screws, pins $d$, or the like. Each of said bent or angle strips $b'$ is capable of being bent or turned upwardly for the insertion of the cake C of disinfecting or deodorizing material, or said strips can each be pivoted to the plate B in a manner to permit them to be turned outwardly for the same purpose.

The sheet-metal plate B, holding the disinfectant C, has a number of openings $b$, through which the air saturated with dissolved disinfectant or deodorizing substances, which is somewhat heavier than ordinary air, can descend and pass into the closet waste-pipe. These holes or openings $b$ can be disposed in any arrangement desired.

Fig. 3 shows a modification of the sheet-metal plate or holder $B'$ for receiving the cake or block of disinfecting substance C, which cake or block in this case is not let into the privy or closet lid $A'$, and said holder is in the shape of a pan directly attached by its edge $b^2$ beneath the lid at the edge. Such arrangement is especially suitable when the ordinary closet-covers at present in use are to be provided with this improved arrangement.

By removing all but one of the fastenings $d$ the plate or holder can be swung around and the cake readily inserted, after which said fastenings can be again replaced.

Preferably the cake or block of deodorizing or disinfecting material is a little less in thickness than the depth of the space in which the same is contained, thus leaving a space 3 above the cake both for the accommodation of the fastenings $b'$ (when used) and the passage or circulation of air, which readily finds its way through the crevice between the plate or holder and the lid.

It will be seen that by use of my improved arrangement I am enabled to avoid all waste of disinfecting or deodorizing material, such as occurs with that class of similar devices in which such material is employed in granulated or powdered form. I am also enabled to dispense with the use of valves, which are employed in other constructions.

For water and earth closets, for instance, the lid or cover may be provided with a pleasant-smelling perfume instead of a disinfecting substance.

Having now particularly described and ascertained the nature of my said invention and in what manner the same is to be performed, I declare that what I claim is—

In a water-closet or other similar vessel, the combination of an imperforate lid therefor, a cake or block of disinfecting or deodorizing material, a perforated support therefor arranged externally on the under side of the lid, with means permitting a circulation of air around the cake and into the vessel, and metal strips movably attached to said support near its edges and bent to overlap the edges of the cake, substantially as described.

In testimony whereof I affix my signature in presence of two witnesses.

JULIUS SOMMER.

Witnesses:
 SAMSON HÜMERBERG,
 H. WAGNER.